United States Patent
Ho et al.

(10) Patent No.: US 9,026,971 B1
(45) Date of Patent: May 5, 2015

(54) MULTI-PATTERNING CONFLICT FREE INTEGRATED CIRCUIT DESIGN

(71) Applicant: Taiwan Semiconductor Manufacturing Co., Ltd., Hsin-Chu (TW)

(72) Inventors: Chien Lin Ho, Taichung (TW); Chin-Chang Hsu, Banqiao (TW); Hung Lung Lin, Hsinchu (TW); Wen-Ju Yang, Hsinchu (TW); Yi-Kan Cheng, Taipei (TW); Tsong-Hua Ou, Taipei (TW); Wen-Li Cheng, Taipei (TW); Ken-Hsien Hsieh, Taipei (TW); Ching Hsiang Chang, New Taipei (TW); Ting Yu Chen, Hsinchu (TW); Li-Chun Tien, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/148,898

(22) Filed: Jan. 7, 2014

(51) Int. Cl.
*G06F 17/50* (2006.01)

(52) U.S. Cl.
CPC .................................. *G06F 17/5081* (2013.01)

(58) Field of Classification Search
CPC .................................. G06F 17/30; G06F 17/50
USPC .................................................. 716/112
See application file for complete search history.

(56) References Cited

U.S. PATENT DOCUMENTS

| 2008/0189672 | A1* | 8/2008 | Shin et al. ........................ 716/19 |
| 2013/0074018 | A1* | 3/2013 | Hsu et al. ........................ 716/55 |
| 2013/0074024 | A1* | 3/2013 | Chase et al. .................... 716/112 |
| 2013/0320555 | A1* | 12/2013 | Yu-Tseng et al. .............. 257/774 |

* cited by examiner

*Primary Examiner* — Vuthe Siek
*Assistant Examiner* — Mohammed Alam
(74) *Attorney, Agent, or Firm* — Eschweiler & Associates, LLC

(57) ABSTRACT

The present disclosure relates to a method and apparatus for forming a multiple patterning lithograph (MPL) compliant integrated circuit layout by operating a construction validation check on unassembled IC cells to enforce design restrictions that prevent MPL conflicts after assembly. In some embodiments, the method is performed by generating a plurality of unassembled integrated circuit (IC) cells having a multiple patterning design layer. A construction validation check is performed on the unassembled IC cells to identify violating IC cells having shapes disposed in patterns comprising potential multiple patterning coloring conflicts. Design shapes within a violating IC cell are adjusted to achieve a plurality of violation free IC cells. The plurality of violation free IC cells are then assembled to form an MPL compliant IC layout. Since the MPL compliant IC layout is free of coloring conflicts, a decomposition algorithm can be operated without performing a post assembly color conflict check.

20 Claims, 7 Drawing Sheets

MULTI-PATTERNING CONFLICT FREE INTEGRATED CIRCUIT DESIGN

BACKGROUND

The semiconductor industry has continually improved the speed and power of integrated circuits (ICs) by reducing the size of components within the ICs. In large part, the ability to scale the size of components within an integrated chip is driven by lithographic resolution. However, in recent years tool vendors have been unable to decrease the wavelength of photolithography exposure tools (e.g., to successfully implement EUV lithography), so that developing technology nodes often have minimum feature sizes less than the wavelength of illumination used in the photolithography tools. To continue scaling, IC fabrication processes use tricks (e.g., immersion lithography, dual tone resist, etc.) that improve the resolution of existing photolithography tools in a manner that extends their usefulness.

Multiple patterning lithography (MPL) is one photolithography strategy that is used in advanced technology nodes to decrease the minimum spacing between shapes. To perform MPL, an IC layout is decomposed according to an algorithm that assigns different 'colors' to design shapes separated by a space less than a printable threshold. The different colors correspond to different photomasks, such that features of a same color are formed on a same mask of a multiple mask set. By separating IC layout data onto different masks, design shapes can be separated by spaces below a printable threshold since the features comprised within separate masks do not violate the printable threshold.

DETAILED DESCRIPTION

Figure 1:
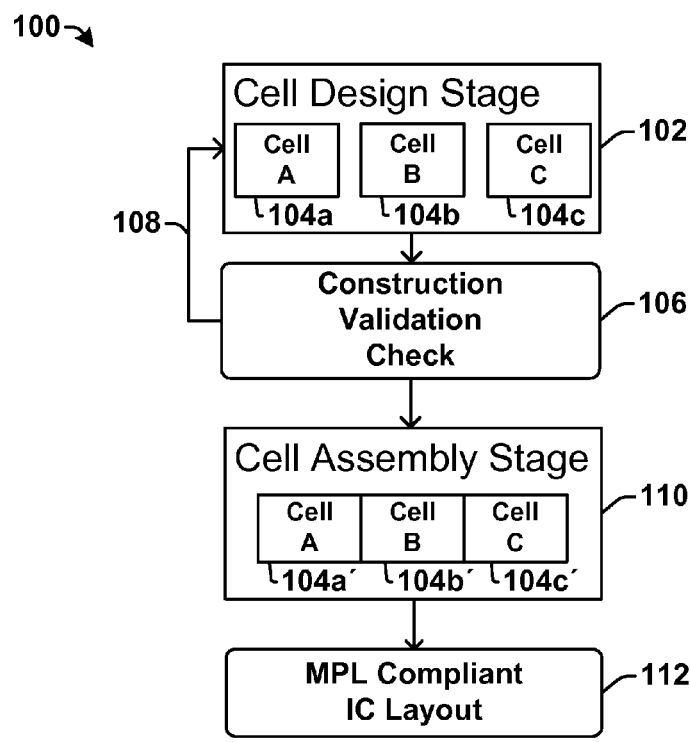
FIG. 1 illustrates some embodiments of a flow diagram showing the application of a construction validation check on unassembled integrated circuit (IC) cells to generate a multiple patterning lithography (MPL) compliant IC layout.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Integrated circuits (ICs) are often generated by assembling a plurality of individually designed IC cells respectively comprising a plurality of design shapes. To increase the density of an integrated circuit, the IC cells may comprise a plurality of design shapes separated by a minimum allowed space. However, as the size of integrated circuits has continued to scale, photolithography tools have been unable to print design shapes at a minimum allowed space using a single photomask. Therefore, multiple patterning lithography (e.g., double patterning lithography, triple patterning lithography, etc.) has become a commonly used technique to achieve minimum allowed spaces (i.e., G0-spaces) smaller than that achievable using a single photomask. Multiple patterning lithography uses a decomposition algorithm to assign different 'colors' to design shapes within an IC cell, such that adjacent design shapes separated by a sub G0-space are assigned different colors. Shapes having a same color are subsequently formed on a same photomask, thereby preventing design shapes separated by a sub G0-space from being placed on a same mask.

While a coloring conflict can be detected in double patterning lithography (DPL) using a simple processes that identifies an odd loop in a conflict graph (a closed loop having an odd number of connections), the detection of a coloring conflict in triple patterning lithography (TPL) is a much more complex problem (classified as a NP-complete problem in computational complexity theory). Furthermore, since TPL coloring conflicts are not identified until after assembly of IC cells has occurred, the correction of the TPL coloring conflicts is a time consuming process since IC cells are adjusted at the cell level and then reassembled and color conflict checked.

Accordingly, some aspects of the present disclosure provide for a method and apparatus for forming a multiple patterning lithography (MPL) compliant integrated circuit layout by operating a construction validation check on unassembled, individual IC cells to enforce design restrictions that prevent MPL conflicts after assembly. In some embodiments, the method comprises generating a plurality of unassembled integrated circuit (IC) cells having a multiple patterning design layer. A construction validation check is performed on the unassembled IC cells using one or more rule based design constraints to identify violating IC cells having shapes disposed in patterns comprising potential multiple patterning coloring violations (i.e., that can lead to multiple patterning coloring violations). Design shapes within a violating IC cell are adjusted to achieve a plurality of violation free IC cells. The plurality of violation free IC cells are then assembled to form an MPL compliant IC layout. A decomposition algorithm can assign colors to shapes within the MPL compliant IC layout without performing a potentially time consuming post assembly color conflict check.

FIG. 1 illustrates some embodiments of a flow diagram 100 showing the application of a construction validation check on unassembled IC cells to generate a MPL compliant IC layout (i.e., an IC layout having a conflict free multiple patterning design layer).

During a cell design stage 102 a plurality of integrated chip (IC) cells 104a-104c having a multiple patterning design layer are generated. Respective IC cells comprise a group of semiconductor devices that provide a logic function (e.g., AND, OR, inverter, etc.) or a storage function (e.g., a flip-flop or latch), for example. The multiple patterning design layer comprises a design layer that is to be formed using a multiple patterning lithography approach (e.g., triple patterning lithography, quad patterning lithography, etc.). The multiple patterning design layer comprises design shapes that are separated by spaces that are smaller than a space that can be printed using a single photomask, also known as a 'G0-space'.

A construction validation check 106 is performed on unassembled IC cells to identify violating IC cells having design shapes disposed in patterns comprising potential multiple patterning coloring conflicts. The potential multiple patterning coloring conflicts are patterns of design shapes that can cause multiple patterning coloring conflicts when a violating IC cell is assembled with other IC cells. For example, when a first IC cell 104a is abutted with a second IC cell 104b multiple patterning coloring conflicts may arise due to an interaction of design shapes within the first and second IC cells, 104a and 104b. In some embodiments, the construction validation check 106 may comprise one or more rule based design constraints that limit placement of shapes within an IC cell.

If an IC cell comprises design shapes disposed in a patterns that violate the construction validation check 106 (i.e., that are identified as potentially leading to multiple patterning coloring conflicts), the flow diagram 100 returns to the cell design stage 102, by way of 108, where a violating IC cell is adjusted to alter the patterns comprising potential multiple patterning coloring conflicts and therefore to achieve a violation free IC cell. In some embodiments, the flow diagram may iteratively alternate between the cell design stage 102 and the construction validation check 106. For example, altering a pattern comprising a potential multiple patterning coloring conflict may eliminate an initial violation, but it may cause another violation to arise, requiring an additional iteration.

Once the plurality of IC cells 104a-104c are free of violations, a plurality of violation free IC cells 104a'-104c' are provided to a cell assembly stage 110 configured to assembly the plurality of violation free IC cells 104a'-104c' into a multiple patterning compliant IC layout 112. As the plurality of violation free IC cells 104a'-104c' are assembled, the violation free IC cells 104a'-104c' are brought into contact with each other so that a cell boundary of a first violation free IC cell (e.g., 104a') abuts a cell boundary of an adjacent, second violation free IC cell (e.g., 104b'). Since the violation free IC cells 104a'-104c' did not violate the construction validation check 106, no coloring conflicts will be present in the multiple patterning compliant IC layout 112 (i.e., inside or between adjacent cells after assembly).

Figure 2:
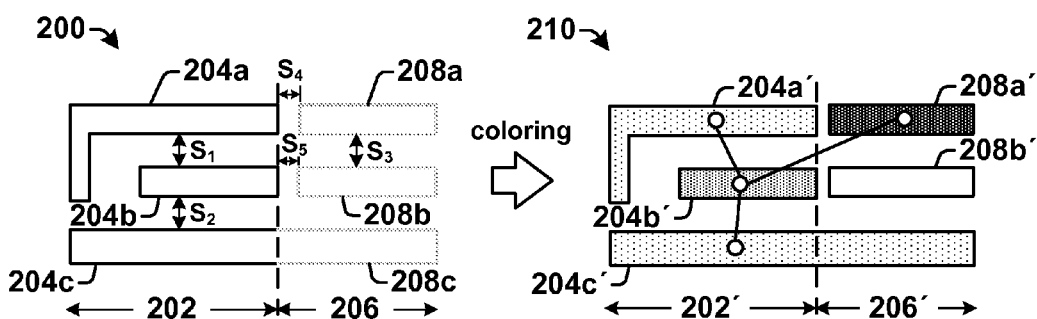
FIG. 2 illustrates some embodiments of performing an exemplary construction validation check on unassembled IC cells to prevent coloring conflicts between abutting IC cells having a multiple patterning design layer.

FIG. 2 illustrates some embodiments of an IC layout 200 showing the application of an exemplary construction validation check to prevent coloring conflicts between abutting IC cells having a multiple patterning design layer.

The IC layout 200 comprises a first IC cell 202 and a second cell IC 206 that abuts the first IC cell 202. The first IC cell 202 comprises a plurality of design shapes 204a-204c. Design shapes 204a and 204b are separated by a space $S_1$ that is less than a G0-space. Similarly, design shapes 204b and 204c are separated by a space $S_2$ that is less than a G0-space. The second IC cell 206 also comprises a plurality of design shapes 208a-208c. Design shapes 208a and 208b are separated by a space $S_3$ that is less than a G0-space.

Prior to assembly of the first and second IC cells, 202 and 204, a construction validation check is configured to determine if design shapes within the first IC cell 202 are disposed in a pattern that may lead to potential multiple patterning coloring conflicts when the first IC cell 202 is assembled with the second IC cell 206. If the construction validation check finds a violation (i.e., indicating a potential multiple patterning coloring conflict) within the first IC cell 202, the first IC cell 202 can be altered (e.g., by increasing the space between design shapes 204a and 204b or by removing one of the design shapes 204a or 204b) to remove the violation.

For example, as shown in IC layout 210, assembly of the first IC cell 202 and the second IC cell 204 will present a coloring conflict with design shapes 208a and 208b. This is because if a first color is assigned to design shape 204a' and a second color is assigned design shape 204b', there are not enough colors remaining to assign different colors to design shapes 208a' and 208b' (i.e., to prevent a sub G0-shapes from having a same color). For example, design shape 206b' will have a color that matches one of design shapes 204a', 204b', or 206a. Since adjacent design shapes would both have the same color, the first IC cell 202 comprises a layout pattern that violates the construction validation check. To prevent the violations, shape 204a and/or 204b can be altered to a position that does not cause a violation.

It will be appreciated that different multiple patterning design layers may have different values of G0-space (i.e., the minimum space between shapes printable on a single photomask). Additionally, different configurations of design shapes on a same multiple patterning design layers may have different G0-spaces. For example, the G0-space for end-to-end configurations is generally larger than the G0-space for end-to-side or side-to-side configurations, due to line end shortening.

Figure 3:
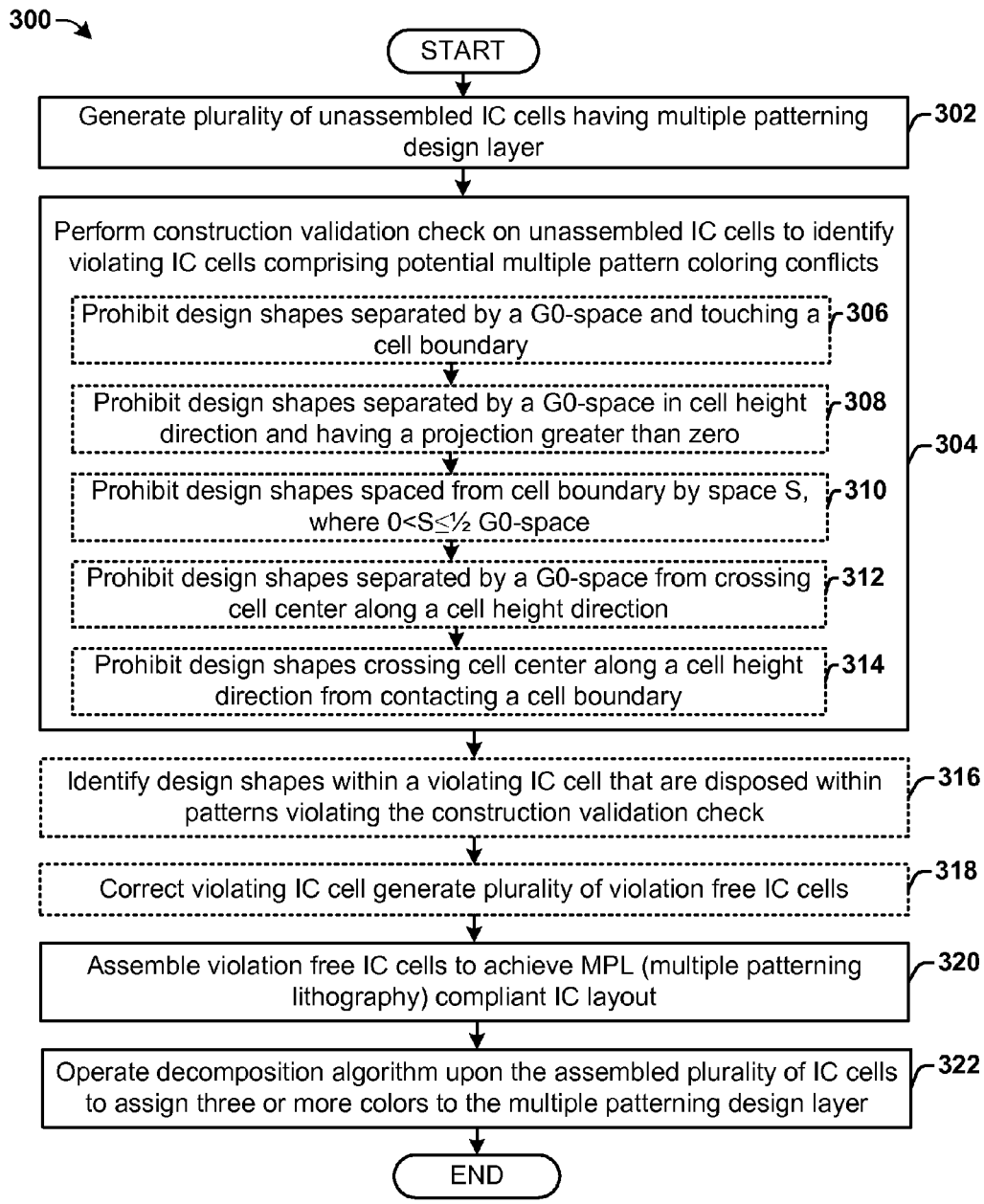
FIG. 3 is a flow diagram of some embodiments of a method of performing a construction validation check on unassembled IC cells to generate a MPL compliant IC layout.

FIG. 3 is a flow diagram of some embodiments of a method 300 of performing a construction validation check on unassembled IC cells to generate a MPL compliant IC layout.

While method 300 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 302, a plurality of unassembled integrated circuit (IC) cells having a multiple patterning design layer are generated. In some embodiments, the multiple patterning design layer comprises a triple patterning design layer that is assigned three different colors to prevent design shapes separated by a sub G0-space from being placed on a same photomask.

At 304, a construction validation check is performed on unassembled IC cells to identify violating IC cells, which have design shapes disposed in patterns comprising potential triple patterning coloring conflicts. The construction validation check may use one or more rule based design constraints to identify patterns of design shapes that may cause TPL conflicts when the IC cell is assembled with an abutting IC cell. In other words, since the content of an abutting cell is not yet know at the cell level, the design constraints disallow design shapes from being disposed in patterns that may cause potential triple patterning conflicts (i.e., design shapes that may not be able to be assigned colors in a manner that prevents adjacent design shapes from having a same color).

In some embodiments, the construction validation check comprises one or more design constraints configured to generate a conflict free triple patterning IC layout. For example, in some embodiments, the construction validation check may comprise a design constraint that prohibits a G0-space between design shapes touching a cell boundary (act 306). In other embodiments, the construction validation check may comprise a design constraint that prohibits design shapes having G0-spacing in a cell height direction and having a projection greater than zero (act 308). In other embodiments, the construction validation check may comprise a design constraint that prohibits design shapes from being spaced apart from a cell boundary by a space that is greater than zero and that is less than or equal to ½ G0-space (act 310). In yet other embodiments, the construction validation check may comprise a design constraint that prohibits a G0-space between design shapes crossing a cell center along a cell height direction (act 312). In yet other embodiments, the construction validation check may comprise a design constraint that prohibits design shapes crossing cell center along a cell height direction from contacting a cell boundary (act 314).

In some embodiments, the design constraints of the construction validation check may be integrated into a design rule checking (DRC) deck. In other embodiments, the design constraints of the construction validation check may be performed as a separate rule based check that is performed prior to or after design rules are checked.

At 316, design shapes within a violating IC cell that are disposed within patterns violating the construction validation check may be identified.

At 318, design shapes violating the construction validation check are altered to achieve a violation free IC cell.

At 320, a plurality of violation free IC cells are assembled to form a multiple patterning lithography (MPL) compliant IC layout. As the plurality of violation free IC cells are assembled, violation free IC cells are brought into contact with each other so that a cell boundary of a first violation free IC cell abuts a cell boundary of an adjacent violation free IC cell. Since the violation free IC cells did not violate the construction validation check, no coloring conflicts will be present in the MPL compliant IC layout.

At 322, a decomposition algorithm is operated upon the MPL compliant IC layout. The decomposition algorithm is configured to assign three or more colors to design shapes within the MPL compliant IC layout. In some embodiments, the decomposition algorithm comprises a triple patterning algorithm configured to assign three colors to design shapes within the MPL compliant IC layout. By assigning different colors to design shapes separated by a sub G0-space, the design shapes are formed by different photomasks thereby preventing the design shapes from being placed on a same photomask of a multi-mask set.

Since the IC cells within the MPL compliant IC layout are violation free, the decomposition algorithm can assign colors without performing a time intensive post assembly color conflict check configured to determine if the MPL compliant IC layout has a coloring conflict. Therefore, by performing the construction validation check on unassembled IC cells prior to cell assembly, method 300 identifies potential coloring conflicts at an early stage that is easily correctable.

FIGS. 4-8 show some embodiments of exemplary IC cells 400-800 having design shapes that illustrate construction validation check rules corresponding to acts 306-312. It will be appreciated that although FIGS. 4-8 are described with respect to a triple-patterning integrated circuit design, the disclosed method and apparatus are not limited to triple patterning integrated circuits layouts. Rather, the disclosed method and apparatus may also apply to other multiple-patterning integrated circuits layouts.

Figure 4:
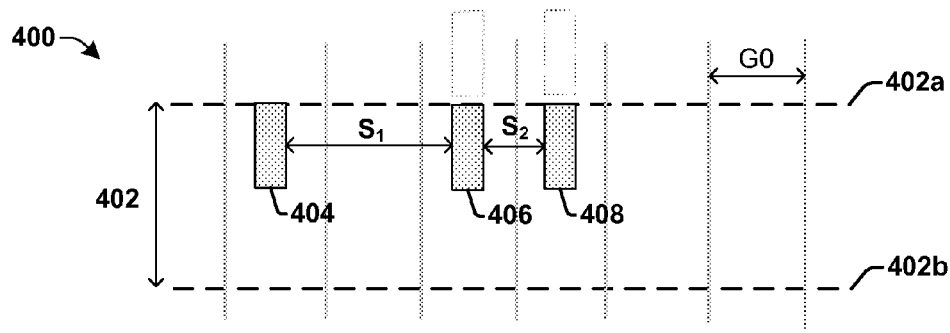
FIGS. 4-8 illustrate some embodiments of exemplary IC cells having design shapes that illustrate construction validation check rules configured to generate a conflict free triple-patterning integrated circuit layout.

FIG. 4 illustrates some embodiments of an exemplary IC cell 400 having design shapes that violate a first design constraint corresponding to act 306. IC cell 400 has a cell height 402 extending between a first cell boundary 402a, and a second cell boundary 402b located on an opposite side of the IC cell 400 as the first cell boundary 402a. The IC cell 400 has a plurality of design shapes 404-408.

The first design constraint prohibits design shapes within a cell from being separated by a G0-space and touching cell boundary. Since design shapes 404 and 406 are separated by a first space $S_1$ that is greater than a G0-space, design shapes 404 and 406 do not violate the first design constraint. However, since design shapes 406 and 408 are separated by a space $S_2$ that is less than G0-space and touch the first cell boundary 402a, the design shapes 406 and 408 violate the first design constraint.

This is because without knowledge of what is in an abutting cell 410, design shapes 406 and 408 may present a future coloring conflict when IC cell 400 is assembled with an adjacent IC cell comprising design shapes 412 and 414. For example, since design shapes 406 and 408 are separated by a space that is less than a G0-space, during decomposition design shapes 406 and 408 will be assigned different colors that place the shapes on separate masks. If design shapes, 412 and 414, are located within a space that is less than a G0-space from design shapes 406 and 408, there is no valid decomposition solution and a TPL conflict is present. To prevent such a possible TPL conflict, the illustrated disposition of design shapes 406 and 408 is prohibited by the first design constraint.

Figure 5:
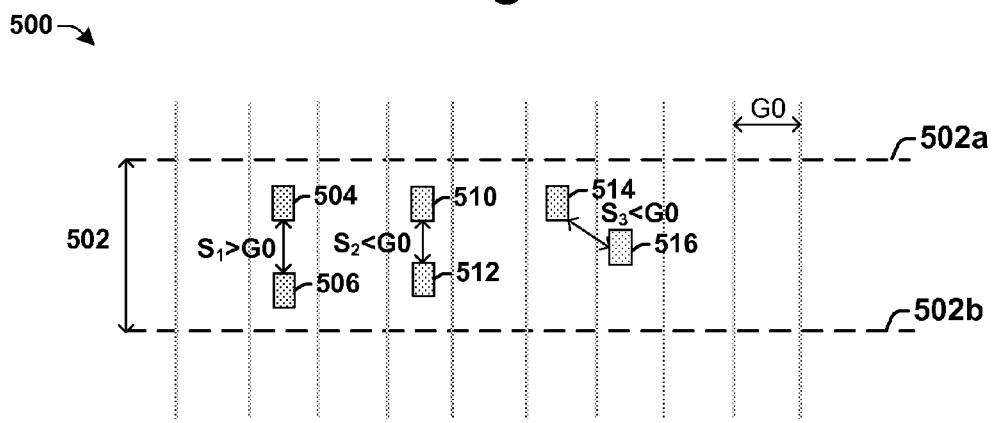

FIG. 5 illustrates some embodiments of an exemplary IC cell 500 having design shapes that violate a second design constraint corresponding to act 308. IC cell 500 has a cell height 502 extending between a first cell boundary 502a, and a second cell boundary 502b located on an opposite side of the IC cell 500 as the first cell boundary 502a. The IC cell 500 has a plurality of design shapes 504-516.

The second design constraint prohibits design shapes having a vertical projection greater than zero from being separated by a G0-space along a cell height direction. Since design shapes 504 and 506 are separated by a space $S_1$ that is greater than a G0-space, design shapes 504 and 506 do not violate the second design constraint. Since design shapes 510 and 512 are separated by a space $S_2$ that is less than a G0-space and since design shapes 510 and 512 project onto one another in a vertical direction, design shapes 510 and 512 violate the second design constraint. To prevent a possible TPL conflict, design shapes 510 and 512 are disallowed by the design constraint corresponding to act 308. Design shapes 514 and 516 are separated by a space $S_3$ that is also less than a G0-space. However, since design shapes 514 and 516 do not project onto one another in a vertical direction, design shapes 514 and 516 do not violate the second design constraint.

Figure 6:
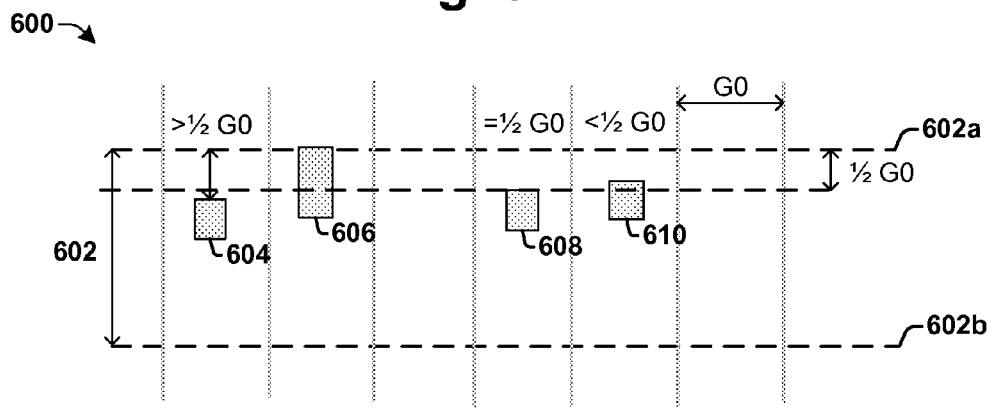

FIG. 6 illustrates some embodiments of an exemplary IC cell 600 having design shapes that violate a design constraint corresponding to act 310. IC cell 600 has a cell height 602 extending between a first cell boundary 602a, and a second cell boundary 602b located on an opposite side of the IC cell 600 as the first cell boundary 602a. The IC cell 600 has a plurality of design shapes 604-610.

The third design constraint prohibits design shapes that are spaced apart from a cell boundary by a space that is greater than 0 and that is less than or equal to ½ G0-space (i.e., 0<S≤½ G0-space). Since design shape 604 is spaced apart from the first cell boundary 602a by a space $S_1$ that is greater than a ½ G0-space, design shape 604 does not violate the third design constraint. Since design shape 606 abuts the first cell boundary 602a, design shape 606 does not violate the third design constraint. Since design shape 608 is spaced apart from the first cell boundary 602a by a design space equal to a ½ G0-space, design shape 608 violates the third design constraint. Since design shape 610 is spaced apart from the first cell boundary 602a by a space less than a ½ G0-space, design shape 610 also violates the third design constraint.

Figure 7:
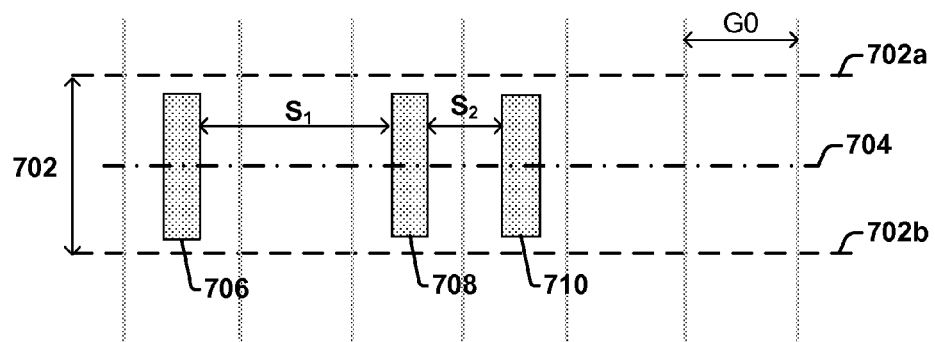

FIG. 7 illustrates some embodiments of an exemplary IC cell 700 having design shapes that violate a fourth design constraint corresponding to act 312. IC cell 700 has a cell height 702 extending between a first cell boundary 702a and a second cell boundary 702b located on an opposite side of the IC cell 700 as the first cell boundary 702a. IC cell 700 also comprises a cell center line 704 extending down a center of the IC cell 700. The IC cell 700 has a plurality of design shapes 706-710.

The fourth design constraint prohibits a G0-space between design shapes crossing cell center along a direction of the cell height 702 (i.e., a cell-height direction). Since design shapes 706 and 708 are separated by a first space $S_1$ that is greater than a G0-space, design shapes 706 and 708 do not violate the fourth design constraint. Since design shapes 708 and 710 are separated by a second space $S_2$ that is less than a G0-space and touch the first cell boundary 702a, the design shapes 708 and 710 violate the fourth design constraint.

Figure 8:
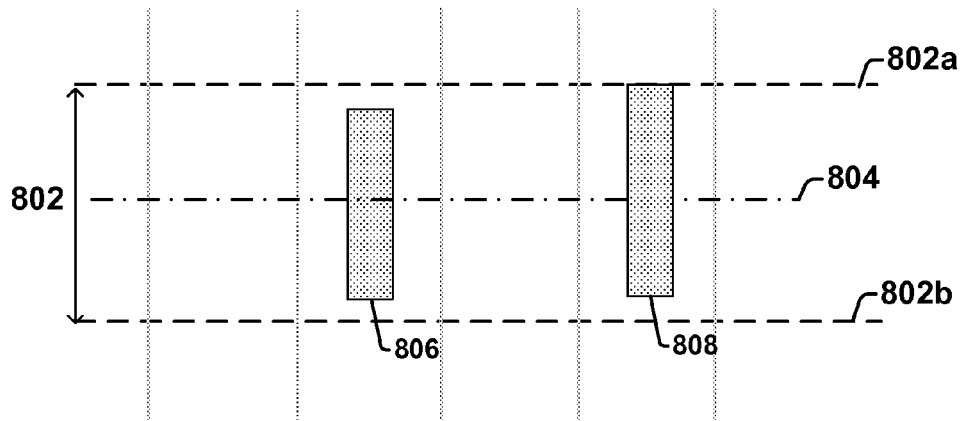

FIG. 8 illustrates some embodiments of an exemplary IC cell 800 having design shapes that violate a fifth design constraint corresponding to act 314. IC cell 800 has a cell height 402 extending between a first cell boundary 802a and a second cell boundary 802b located on an opposite side of the IC cell 800 as the first cell boundary 802a. IC cell 800 also comprises a cell center line 804 extending down a center of the IC cell 800. The IC cell 800 has a plurality of design shapes 806-808.

The fifth design constraint prohibits design shapes crossing a cell center along a cell height direction from contacting a cell boundary. Since design shape 806 does not contact a cell boundary, design shape 806 does not violate the fifth design constraint. Since design shape 808 does contact the first cell boundary 802a and crosses cell center line 804 along a cell height direction, design shape 808 violates the fifth design constraint.

Figure 9:
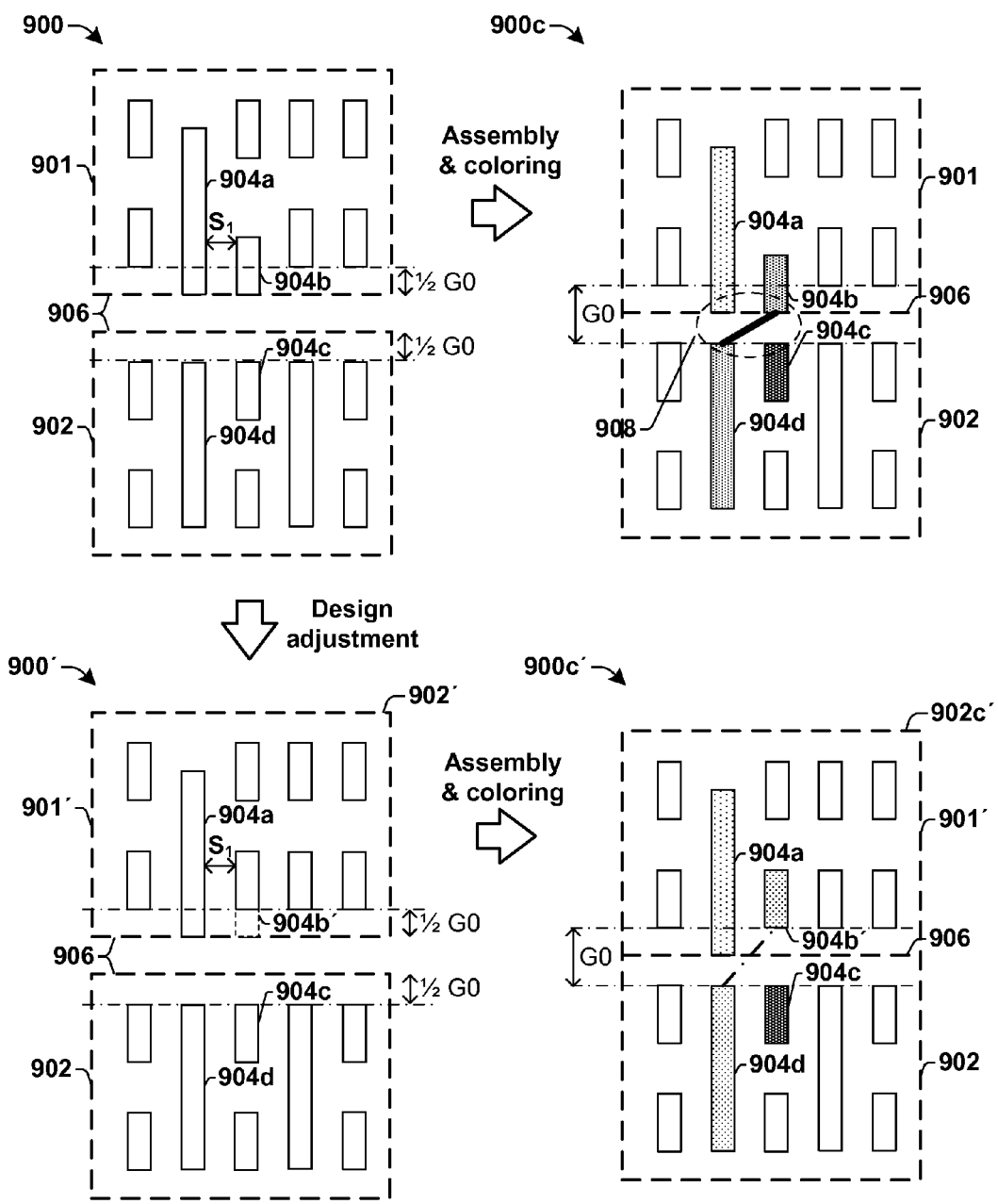
FIGS. 9-10 illustrate some embodiments of IC layouts showing how an IC cell can be changed in response to a violation of a construction validation check.
Figure 10:
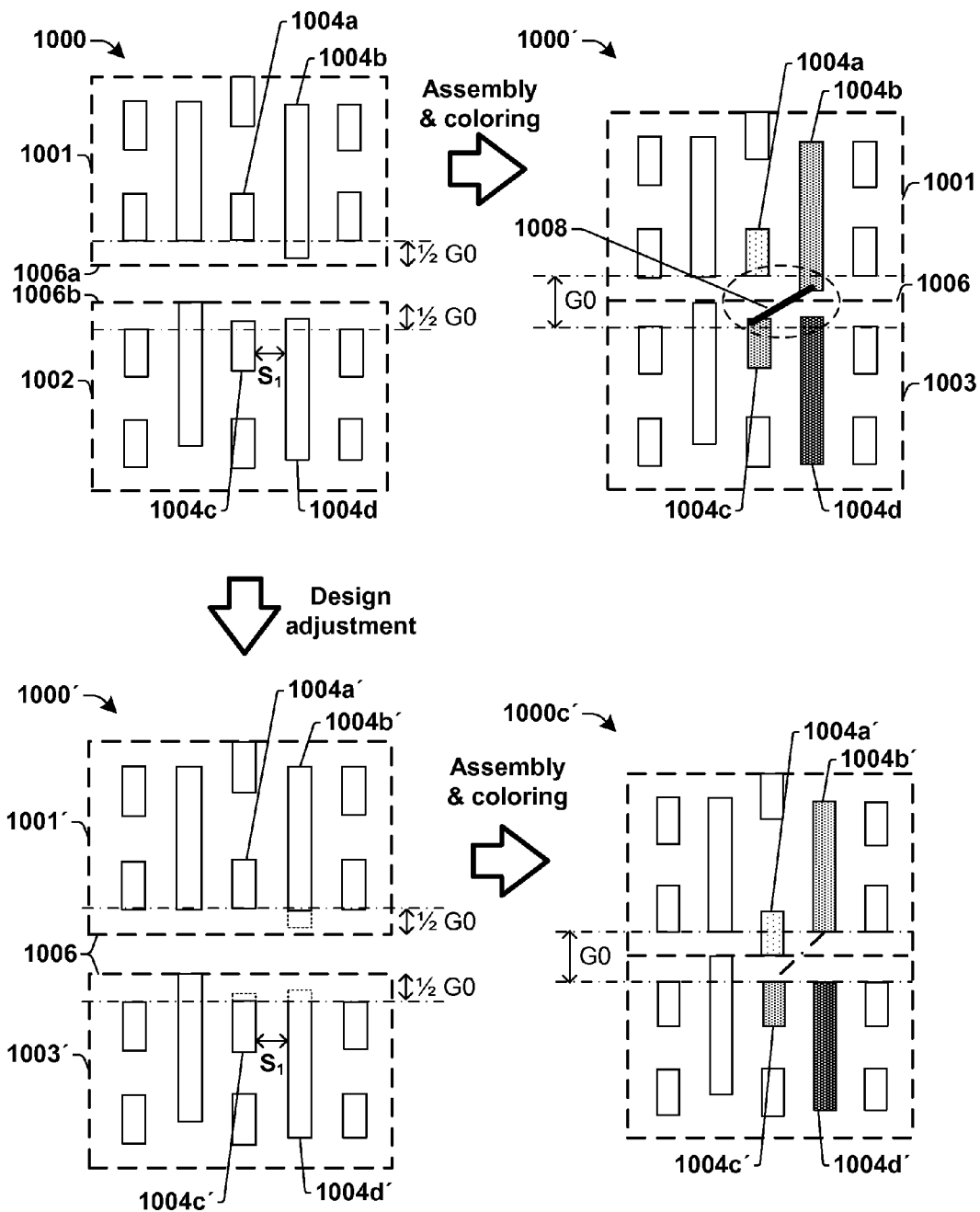

FIGS. 9-10 illustrate some embodiments of IC layouts showing how an IC cell can be changed in response to a violation of a construction validation check to form a triple patterning lithography (TPL) compliant IC layout.

FIG. 9 illustrates some embodiments of exemplary IC layouts illustrating a change that can be made in response to a violation of a first design constraint corresponding to act 306 (i.e., prohibiting design shapes within an IC cell that are separated by a G0-space and that touch a cell boundary).

IC layout 900 comprises an unassembled first IC cell 901 and an unassembled second IC cell 902. The first IC cell 901 comprises design shapes 904a-904b that abut a cell boundary 906a, and which are separated by a space $S_1$ that is less than a G0-space. Since design shapes 904a and 904b are separated by a space $S_1$ that is less than a G0-space and abut cell boundary 906a, the design shapes 904a and 904b violate the first design constraint. This is because the design shapes 904a and 904b will lead to a coloring conflict when the first IC cell 901 is abutted with the second IC cell 902, as shown in IC layout 900c (e.g., since design shapes 904a-904d are unable to be assigned separate colors, at least two design shapes separated by a spacing less than a G0-space will be assigned a same color).

By making a design adjustment to IC layout 900, the violation of the first design constraint can be eliminated. For example, IC layout 900' illustrates a potential adjustment to IC layout 900. As shown in IC layout 900', within the first IC cell 901' the position of design shape 904b' has been changed so that design shape 904b' is separated from the cell boundary 906 by a distance equal to a G0-space. By moving the position of design shape 904b' away from the cell boundary 906, a TPL compliant IC layout will be generated upon assembly and coloring. For example, as shown in IC layout 900c', when the adjusted first IC cell 901' is abutted with the second IC cell 902, design shapes 904a-904b' are able to be assigned separate colors without causing a triple patterning coloring conflict (i.e., so that no two design shapes separated by a spacing less than a G0-space will be assigned a same color).

FIG. 10 illustrates some embodiments of exemplary IC layouts illustrating a change that can be made in response to a violation of a third design constraint corresponding to act 310 (i.e., prohibiting design shapes within an IC cell that are separated from a cell boundary by a space S, where 0<S≤½ G0-space).

IC layout 1000 comprises an unassembled first IC cell 1001 and an unassembled second IC cell 1002. The first IC cell 1001 comprises design shapes 1004a-1004b that abut a cell boundary 1006a, and which are separated by a space $S_1$ that is less than a G0-space. Since design shapes 1004a and 1004b are separated by a space $S_1$ that is less than a G0-space and abut cell boundary 1006a, the design shapes 1004a and 1004b violate the third design constraint. This is because the design shapes 1004a and 1004b will lead to a coloring conflict when the first IC cell 1001 is abutted with the second IC cell 1002, as shown in IC layout 1000c (e.g., since design shapes 1004a-1004d are unable to be assigned separate colors, at least two design shapes separated by a spacing less than a G0-space will be assigned a same color).

By making a design adjustment to IC layout 1000, the violation of the third design constraint can be eliminated. For example, IC layout 1000' illustrates a potential adjustment to IC layout 1000. As shown in IC layout 1000', within the first IC cell 1001' the position of design shape 1004b' has been changed so that design shape 1004b' is separated from the cell boundary 1006 by a distance equal to a G0-space. Within the second IC cell 1002' the positions of design shapes 1004c' and 1004d' have been changed so that design shapes 1004c' and 1004d' are separated from the cell boundary 1006 by a distance equal to a G0-space. By moving the positions of design shapes 1004b', 1004c', and 1004d' away from the cell boundary 1006, a MPL compliant IC layout will be generated upon assembly and coloring. For example, as shown in IC layout different colors without causing a triple patterning coloring conflict (i.e., so that no two design shapes separated by a spacing less than a G0-space will be assigned a same color).

Figure 11:
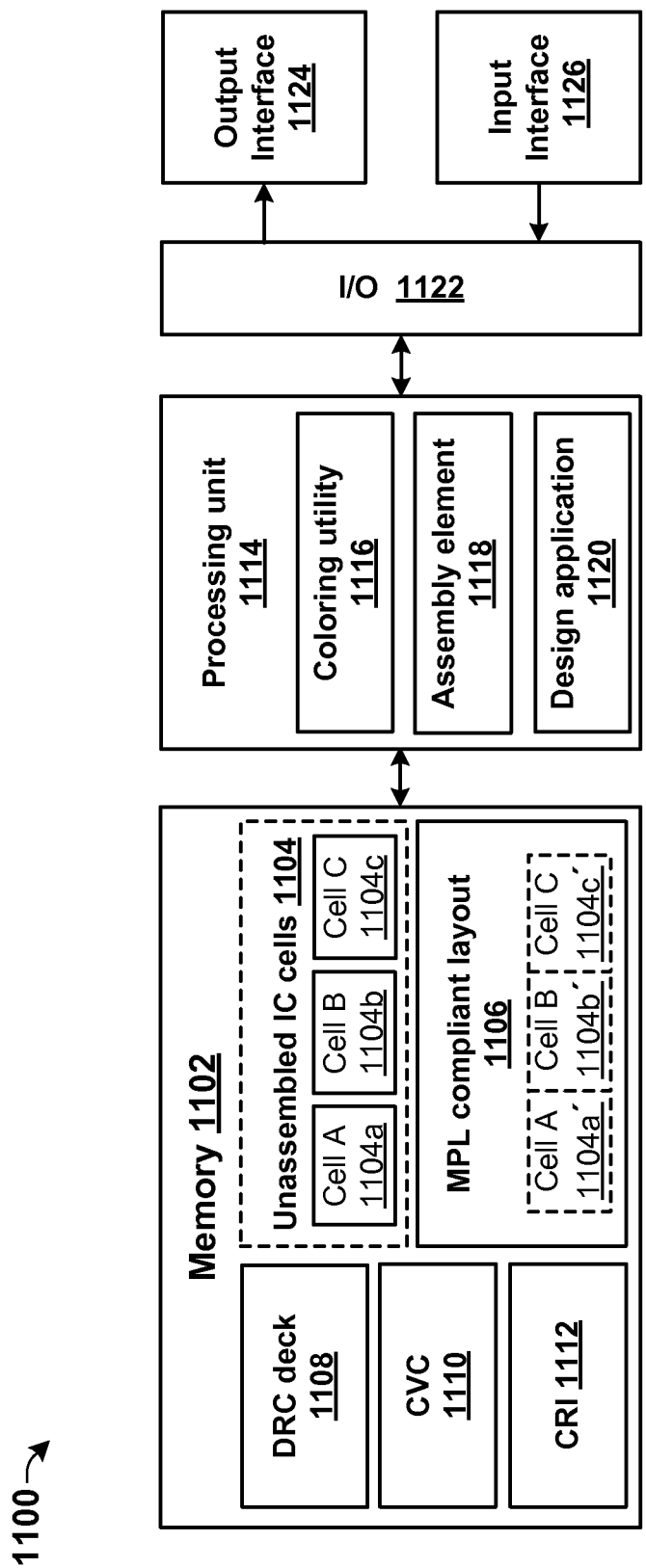
FIG. 11 illustrates some embodiments of a computer system configured to perform a construction validation check on unassembled IC cells to generate a MPL compliant IC layout.

FIG. 11 illustrates some embodiments of a computer system 1100 (e.g., an electronic design automation (EDA) tool) configured to perform a construction validation check on unassembled IC cells to generate a MPL compliant IC layout.

The computer system 1100 includes a memory element 1102 and a processing unit 1114. Memory element 1102 is configured to store a plurality of unassembled IC cells 1104, a MPL compliant IC layout 1106, a DRC deck 1108 comprising design rules specific to a semiconductor process chosen for fabrication of the MPL compliant IC layout 1106, a construction validation check (CVC) 1110, and computer readable instructions (CRI) 1112 that may provide for a method of operating one or more components of the computer system 1100 according to a disclosed method (e.g., method 300). In some embodiments, the memory element 1102 comprises a machine readable storage medium.

The plurality of unassembled IC cells 1104 comprise graphical representations, such as for example GDSII files, of a group of semiconductor devices that provide a logic function (e.g., AND, OR, inverter, etc.) or a storage function (e.g., a flip-flop or latch), for example.

The processing unit 1114 is configured to receive the unassembled IC cells 1104a-1104c and the CVC 1110 as inputs. From the unassembled IC cells 1104a-1104c and the CVC 1110, the processing unit 1114 is configured to perform a construction validation check on the unassembled IC cells 1104a-1104c to identify violating IC cells having design shapes disposed in patterns comprising potential multiple patterning coloring conflicts. The potential multiple patterning coloring conflicts are patterns of design shapes that can cause multiple patterning coloring conflicts when a violating IC cell is assembled with other IC cells. The construction validation check may comprise one or more rule based design constraints that limit placement of design shapes within an IC cell.

In some embodiments, the violations may be provided by way of an I/O 1122 to an output interface 1124 that allows the processing unit 1114 to exchange information with the external environment. In some embodiments, the computer system 1100 further comprises one or more input interfaces 1126 that allow for a designer access a design application 1120 configured to adjust design shapes within a violating IC cell to alter the patterns comprising the potential multiple patterning coloring conflict to achieve a plurality of violation free IC cells 1104a'-1104c'.

An assembly element 1118 is configured to receive the plurality of violation free IC cells 1104a'-1104c' and to assemble the plurality of violation free IC cells 1104a'-1104c' to form the multiple patterning lithography (MPL) compliant IC layout 1106. As the plurality of violation free IC cells 1104a'-1104c' are assembled, the violation free IC cells 1104a'-1104c' are brought into contact with each other so that a cell boundary of a first IC cell 1104a' abuts a cell boundary of an adjacent second IC cell 1104b'. Since the violation free IC cells 1104a'-1104c' do not violate the construction validation check, no coloring conflicts will be present in the MPL compliant IC layout 1106 (i.e., inside or between adjacent cells after assembly).

A coloring element 1116 is configured to operate a decomposition algorithm upon the MPL compliant IC layout 1106. The decomposition algorithm assigns colors to design shapes within the MPL compliant IC layout 1106. In some embodiments, the decomposition algorithm is configured to assign three or more 'colors' to design shapes within the MPL compliant IC layout 1106. By assigning adjacent design shapes different colors, the adjacent design shapes are formed by different photomasks thereby preventing design shapes that are separated by a sub G0-space from being placed on a same photomask of a multi-mask set.

It will be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. For example, although the disclosed IC layouts are illustrated as comprising a plurality of design shapes comprising square or rectangles, it will be appreciated that such shapes are not limiting. Rather, the disclosed method and apparatus may be applied to designs having design shapes of any geometry allowed by design rules. Furthermore, the disclosed shapes may be comprised within any MPL design layer, such as for example, metal interconnect layers, polysilicon layers, active layers, etc.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to a method and apparatus for forming a multiple patterning lithograph (MPL) compliant integrated circuit layout by operating a construction validation check on unassembled IC cells to enforce design restrictions that prevent MPL conflicts after assembly.

In some embodiments, the present disclosure relates to a method for developing a multiple patterning lithography (MPL) compliant integrated circuit layout. The method comprises generating a plurality of unassembled integrated circuit (IC) cells having a multiple patterning design layer. The method further comprises performing a construction validation check on the plurality of unassembled IC cells to identify violating IC cells having design shapes disposed in patterns comprising potential multiple patterning coloring conflicts. The method further comprises adjusting the design shapes within the violating IC cells to eliminate the potential multiple patterning coloring conflicts and to form a plurality of violation free IC cells, and assembling the plurality of violation free IC cells to form a MPL compliant IC layout that is free of the multiple patterning coloring conflicts.

In other embodiments, the present disclosure relates to a method for developing a triple patterning lithography (TPL) compliant integrated circuit layout. The method comprises generating a plurality of unassembled integrated circuit (IC) cells having a triple patterning design layer, and individually performing a construction validation check using one or more rule based design constraints on the plurality of unassembled IC cells to identify violating IC cells having design shapes disposed in patterns comprising potential triple patterning coloring conflicts. The method further comprises adjusting design shapes within the violating IC cell to eliminate the potential triple patterning coloring conflicts and to form a plurality of violation free IC cells, and assembling the plurality of violation free IC cells to form a triple patterning lithography compliant IC layout having at least two of the plurality of IC cells abutting along one or more cell boundaries.

In yet other embodiments, the present disclosure relates to a computer system configured to developing a multiple patterning lithography (MPL) compliant integrated circuit layout. The computer system comprises a memory element configured to store a plurality of unassembled integrated circuit (IC) cells having a multiple patterning design layer. The computer system further comprises a processing unit configured to perform a construction validation check on the plurality of unassembled IC cells to identify violating IC cells having design shapes disposed in patterns comprising potential multiple patterning coloring conflicts. The computer system further comprises a design application configured to adjust the design shapes within the violating IC cells to eliminate the potential multiple patterning coloring conflicts and to form a plurality of violation free IC cells. The computer system further comprises an assembly element configured to assemble the plurality of violation free IC cells to form a MPL compliant IC layout that is free of the multiple patterning coloring conflicts.

What is claimed is:

1. A method for developing a multiple patterning lithography (MPL) compliant integrated circuit layout, comprising:

generating a plurality of unassembled integrated circuit (IC) cells having a multiple patterning design layer;

performing a construction validation check on the plurality of unassembled IC cells to identify violating IC cells having design shapes disposed in patterns comprising potential multiple patterning coloring conflicts;

adjusting the design shapes or positions of the design shapes within the violating IC cells to eliminate the potential multiple patterning coloring conflicts and to form a plurality of violation free IC cells; and assembling the plurality of violation free IC cells, by piecing together the plurality of violation free IC cells so that at least two of the plurality of violation free IC cells abut, to form a MPL compliant IC layout that is free of the potential multiple patterning coloring conflicts;

wherein a computer is used to generate the plurality of unassembled IC cells, to perform the construction validation check, to adjust the design shapes or positions, or to assemble the plurality of violation free IC cells.

2. The method of claim 1, further comprising:
operating a decomposition algorithm on the MPL compliant IC layout to assign three or more colors to the design shapes within the MPL compliant IC layout.

3. The method of claim 2, wherein the multiple patterning design layer comprises a triple patterning design layer having design shapes that are assigned three different colors during operation of the decomposition algorithm.

4. The method of claim 1, wherein the construction validation check comprises one or more design constraints that are applied to individual unassembled IC cells.

5. The method of claim 1, wherein the construction validation check comprises one or more rule based design constraints.

6. The method of claim 5, wherein the one or more rule based design constraints are performed as part of a design rule check (DRC).

7. The method of claim 1, wherein the construction validation check comprises a design constraint that prohibits design shapes within an unassembled IC cell, which are separated by a space that is less than or equal to a G0-space, from touching a cell boundary.

8. The method of claim 1, wherein the construction validation check comprises a design constraint that prohibits a G0-space between design shapes that extend along a cell-height direction within an unassembled IC cell.

9. The method of claim 1, wherein the construction validation check comprises a design constraint that prohibits design shapes from being spaced apart from a cell boundary by a space that is greater than zero and that is less than or equal to ½ G0-space.

10. The method of claim 1, wherein the construction validation check comprises a design constraint that prohibits a G0-space between design shapes crossing a center line of an unassembled IC cell along a cell height direction.

11. The method of claim 1, wherein the construction validation check comprises a design constraint that prohibits design shapes crossing a center line of an unassembled IC cell along a cell height direction from contacting a cell boundary.

12. A method for developing a triple patterning lithography (TPL) compliant integrated circuit layout, comprising:
generating a plurality of unassembled integrated circuit (IC) cells having a triple patterning design layer;
individually performing a construction validation check using one or more rule based design constraints on the plurality of unassembled IC cells to identify violating IC cells having design shapes disposed in patterns comprising potential triple patterning coloring conflicts;
adjusting design shapes or positions of the design shapes within the violating IC cells to eliminate the potential triple patterning coloring conflicts and to form a plurality of violation free IC cells; and
assembling the plurality of violation free IC cells to form a triple patterning lithography compliant IC layout by piecing together at least two of the plurality of violation free IC cells to abut along one or more cell boundaries;
wherein a computer is used to generate the plurality of unassembled IC cells, to individually perform the construction validation check, to adjust the design shapes or positions, or to assemble the plurality of violation free IC cells.

13. The method of claim 12, wherein the construction validation check comprises a rule based design constraint that prohibits design shapes within an unassembled IC cell, which are separated by a space that is less than or equal to a G0-space, from touching a cell boundary.

14. The method of claim 12, wherein the construction validation check comprises a rule based design constraint that prohibits a G0-space between design shapes that extend along a cell-height direction within an unassembled IC cell.

15. The method of claim 12, wherein the construction validation check comprises a rule based design constraint that prohibits design shapes from being spaced apart from a cell boundary by a space that is greater than zero and that is less than or equal to ½ G0-space.

16. The method of claim 12, wherein the construction validation check comprises a rule based design constraint that prohibits a G0-space between design shapes crossing a center line of an unassembled IC cell along a cell height direction.

17. The method of claim 12, wherein the construction validation check comprises a rule based design constraint that prohibits design shapes crossing a center line of an unassembled IC cell along a cell height direction from contacting a cell boundary.

18. A computer system configured to develop a multiple patterning lithography (MPL) compliant integrated circuit layout, comprising:
a memory element configured to store a plurality of unassembled integrated circuit (IC) cells having a multiple patterning design layer;
a processing unit configured to perform a construction validation check on the plurality of unassembled IC cells to identify violating IC cells having design shapes disposed in patterns comprising potential multiple patterning coloring conflicts;
a design application configured to adjust the design shapes or positions of the design shapes within the violating IC cells to eliminate the potential multiple patterning coloring conflicts and to form a plurality of violation free IC cells; and
an assembly element configured to assemble the plurality of violation free IC cells, by piecing together the plurality of violation free IC cells so that at least two of the plurality of violation free IC cells abut, to form a MPL compliant IC layout that is free of the potential multiple patterning coloring conflicts.

19. The computer system of claim 18, further comprising:
a coloring element configured to operate a decomposition algorithm on the MPL compliant IC layout to assign three or more colors to the design shapes within the MPL compliant IC layout.

20. The computer system of claim 19, wherein the multiple patterning design layer comprises a triple patterning design layer having design shapes that are assigned three different colors during operation of the decomposition algorithm.

* * * * *